US012590664B2

(12) United States Patent
Martin et al.

(10) Patent No.: US 12,590,664 B2
(45) Date of Patent: Mar. 31, 2026

(54) COATING MATERIAL SUPPLY DEVICE

(71) Applicant: Dürr Systems AG,
Bietigheim-Bissingen (DE)

(72) Inventors: Herbert Martin,
Weinstadt-Grossheppach (DE);
Manfred Michelfelder, Steinheim
(DE); Alexander Falheier,
Ludwigsburg (DE)

( * ) Notice: Subject to any disclaimer, the term of this
patent is extended or adjusted under 35
U.S.C. 154(b) by 9 days.

(21) Appl. No.: 18/711,942

(22) PCT Filed: Nov. 22, 2022

(86) PCT No.: PCT/EP2022/082690
§ 371 (c)(1),
(2) Date: May 21, 2024

(87) PCT Pub. No.: WO2023/094339
PCT Pub. Date: Jun. 1, 2023

(65) Prior Publication Data
US 2025/0020260 A1 Jan. 16, 2025

(30) Foreign Application Priority Data
Nov. 26, 2021 (DE) .................... 10 2021 131 136.5

(51) Int. Cl.
B05C 11/10 (2006.01)
F16L 55/26 (2006.01)
(52) U.S. Cl.
CPC .......... F16L 55/26 (2013.01); B05C 11/1026
(2013.01)
(58) Field of Classification Search
CPC ... B05B 12/1481; B05C 11/1026; F16L 55/26
See application file for complete search history.

(56) References Cited

U.S. PATENT DOCUMENTS 7,793,858 B2 * 9/2010 Heldt .................. B05B 12/1481
239/303
9,050,614 B2 * 6/2015 Heldt ........................ B05B 9/04
(Continued)

FOREIGN PATENT DOCUMENTS

DE 60302702 T2 10/2006
EP 1270083 B1 12/2005
EP 1812168 B1 9/2009

OTHER PUBLICATIONS

International Search Report and Written Opinion for PCT/EP2022/
082690 mailed Feb. 24, 2023 (11 pages; with English translation).

*Primary Examiner* — Jason K Niesz
(74) *Attorney, Agent, or Firm* — Taft Stettinius &
Hollister LLP; Thomas E. Bejin; John W. Carpenter

(57) ABSTRACT

The disclosure relates to a coating agent supply device for
supplying coating agent (e.g. paint) to an applicator (e.g.
rotary atomizer). The coating agent supply device according
to the disclosure has a pig source station, a pig destination
station and a pig line which connects the pig source station
to the pig destination station. The pig line contains a pig
package with two pigs for clamping the coating agent
between the two pigs of the pig package for coating agent
transport between the pig source station and the pig desti-
nation station. Furthermore, the coating agent supply device
has a lubricant supply line for supplying a lubricant for
friction-reducing lubrication of the pigs in the pig line when
moving the pig package between the pig destination station
and the pig source station. In addition, the coating agent
supply device according to the disclosure has a controllable
lubricant valve, which connects the lubricant supply line to
the pig line in order to feed the lubricant into the pig line at
a lubricant feed point. The disclosure provides that the
lubricant feed point is located in the pig line between the pig
source station and the pig destination station.

20 Claims, 3 Drawing Sheets

(56) References Cited

U.S. PATENT DOCUMENTS

| | | |
|---|---|---|
| 2008/0023571 A1 | 1/2008 | Heldt et al. |
| 2012/0037716 A1 | 2/2012 | Heldt et al. |

\* cited by examiner

COATING MATERIAL SUPPLY DEVICE

CROSS-REFERENCE TO RELATED APPLICATIONS

This application is a national stage of, and claims priority to, Patent Cooperation Treaty Application No. PCT/EP2022/082690, filed on Nov. 22, 2022, which application claims priority to German Application No. DE 10 2021 131 136.5, filed on Nov. 26, 2021, which applications are hereby incorporated herein by reference in their entireties.

TECHNICAL FIELD

The disclosure relates to a coating agent supply device for supplying coating agent (e.g. paint) to an applicator (e.g. rotary atomizer), in particular in a painting installation for painting motor vehicle body components.

BACKGROUND

In modern painting installations for painting vehicle body components, paint supply systems are often used with a pig line that connects a pig source station with a pig destination station. In the pig line, pigs can be moved along the pig line by a pushing medium (e.g. compressed air).

On the one hand, this enables the pig line to be emptied and cleaned by moving a pig through the pig line by the pushing medium, thereby pushing out the paint located in the pig lead.

On the other hand, this principle of pigging also enables potential separation between the pig source station, which is at ground potential, on the one hand, and the pig destination station, which is at high-voltage potential, on the other. For this purpose, the pig line is drained, flushed and cleaned so that no electrical flashovers can occur along the pig lead, which consists of an electrically insulating material.

It is also known from the prior art to use in such a coating agent supply device a pig package consisting of two pigs, namely a so-called pushout pig and a so-called reflow pig. Here, the pushout pig is arranged in the pig line on the side of the pig source station, while the reflow pig is arranged in the pig line on the side of the pig destination station.

In the pig source station, a column of paint can be filled into the pig line between the pushout pig and the reflow pig, which is then transported by the pig package to the pig destination station, where the paint to be applied is removed from the pig package.

At the end of the application process, excess paint can then be transported by the pig package back to the pig source station, where the paint is then returned from the pig package to a recirculation system, allowing the excess paint to be reused at a later stage and thus reducing paint consumption.

In this so-called reflow process, the pig package with the pushout pig and the reflow pig is moved back to the pig source station in the otherwise emptied and almost dry pig line, which leads to relatively high mechanical friction between the pigs and the pig line and negatively influences the service life of the pigs. During the reflow process, the pigs must therefore not exceed a movement speed of maximum 1 m/s, as the frictional heat can otherwise lead to an excessive temperature increase at the sealing lips of the pigs, which in extreme cases could lead to a deformation and defect of the pigs. In the known piggable line arrangements, the speed of movement of the pigs is therefore limited, which limits the performance of the known painting installations.

From EP 1 812 168 B1 such a coating agent supply device with a pig line is known. Here, the problem of friction of the pigs in the pig line is at least partially solved by introducing lubricant (e.g. solvent) into the pig line between the two pigs of the pig package to reduce the friction of the pigs in the pig line. In this case, the lubricant feed point for feeding the lubricant into the pig line is located in the pig destination station so that the lubricant can be fed into the pig line between the two pigs of the pig pack.

However, this known coating agent supply device does not yet satisfactorily solve the problem of pig friction in the pig line, since the sealing lips of the pushout pig are not lubricated during a reflow process. Therefore, even with this known coating agent supply device, the maximum permissible speed of movement of the pigs during a reflow process is limited.

Finally, with regard to the technical background of the disclosure, reference should also be made to DE 603 02 702 T2.

The disclosure is therefore based on the task of creating a correspondingly improved coating agent supply device.

DETAILED DESCRIPTION

Figure 1:
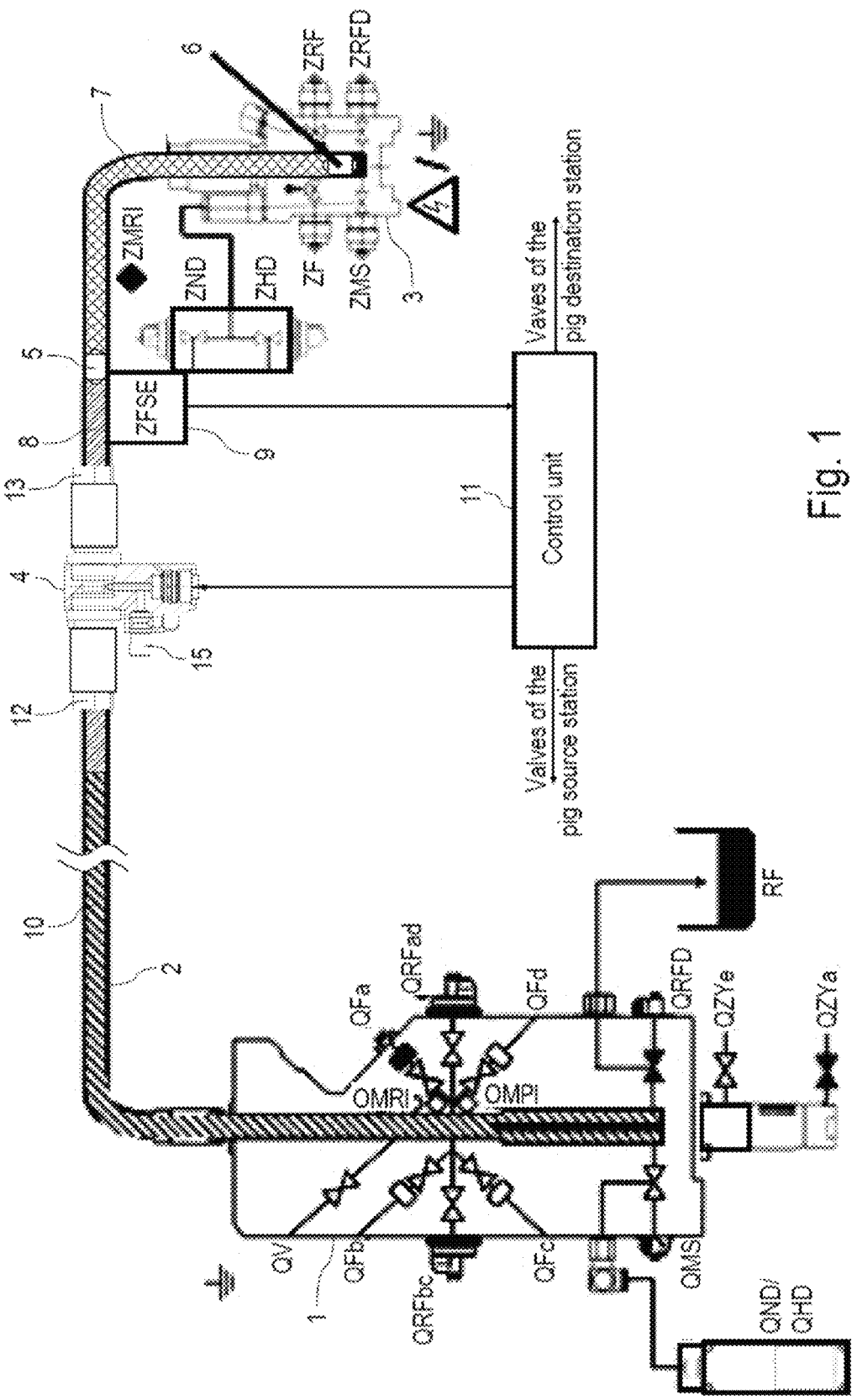
FIG. 1 shows a schematic representation of a paint supply according to the disclosure for supplying a rotary atomizer in a paint shop for painting motor vehicle body components.

The coating agent supply device according to the disclosure is used to supply coating agent (e.g. paint) to an applicator (e.g. rotary atomizer). However, the disclosure is not limited to paint with regard to the coating agent, but can in principle also be implemented with other coating agents. In addition, the disclosure is not limited to rotary atomizers with regard to the applicator to be supplied, but is in principle also suitable for supplying other types of applicators (e.g. print heads). In a preferred embodiment of the disclosure, however, the coating agent supply device serves to supply paint to a rotary atomizer in a paint shop for painting motor vehicle body components.

In accordance with the prior art described at the outset, the coating agent supply device according to the disclosure comprises a pig source station and a pig destination station, which are connected to one another by a pig line. In the pig line there is a pig package with two pigs for clamping the coating agent between the two pigs of the pig package, so that the pig package can transport a column of coating agent between the pig source station and the pig destination station. The pig located downstream is also referred to as a reflow pig, while the pig located upstream is referred to as a pushout pig.

The pushout pig is driven to transport the coating agent column clamped in the pig package from the pig source station to the pig destination station in a so-called pushout process.

The reflow pig, on the other hand, is driven to transport the coating agent column clamped in the pig package back from the pig destination station to the pig source station in a so-called reflow process.

The terms "upstream" and "downstream" here and below refer to the normal flow direction from the pig source station to the pig destination station, i.e. not to the reflow process in which the flow direction is reversed.

In addition, the coating agent supply device according to the disclosure, in accordance with the known coating agent supply device described above according to EP 1 812 168 B1, also has a lubricant supply line in order to supply a lubricant which is intended to enable friction-reducing lubrication of the pigs in the pig line, when the pig package is moved between the pig destination station and the pig source station.

Furthermore, the coating agent supply device according to the disclosure, in accordance with the known coating agent supply device described above according to EP 1 812 168 B1, also has a controllable lubricant valve which connects the lubricant supply line to the pig line in order to control the introduction of the lubricant into the pig line at a lubricant feed point.

It has already been explained above with regard to the prior art that the lubricant feed point in the prior art is located in the pig destination station so that the lubricant can be introduced into the pig line between the two pigs of the pig package. In contrast to this, the disclosure now provides that the lubricant feed point is located in the pig line between the pig source station and the pig destination station, i.e. outside the pig destination station and also outside the pig source station. In a reflow process, this allows the pushout pig to also be lubricated by introducing the lubricant into the pig line before the pushout pig in relation to the direction of movement of the pushout pig during the reflow process. This lubrication of the pushout pig during the reflow process reduces the friction between the pigs and the pig line and thus enables a higher movement speed of the pigs during the reflow process.

In a preferred embodiment of the disclosure, the lubricant valve in the pig line is located closer to the pig destination station than to the pig source station. The lubricant valve is therefore preferably located in the downstream 50%, 40%, 30%, 20%, 10%, 5% or 3% of the line length of the pig line. In absolute numbers it can be said that the distance between the lubricant valve and the pig destination station along the pig line is preferably smaller than 15 m, 10 m, 5 m, 3 m, 2 m, 1 m, 50 cm, 20 cm or 10 centimeters. This arrangement of the lubricant valve and thus also the lubricant feed point near the pig destination station is advantageous so that the pigs are lubricated by the fed lubricant over their entire movement distance from the pig destination station to the pig source station during a reflow process.

It has already been explained above in relation to the prior art that in the known coating agent supply device according to EP 1 812 168 B1 (corresponding to U.S. Pat. No. 7,793,858 B2), which is incorporated by reference, the lubricant is fed into the pig line between the two pigs of the pig package. However, this is problematic if the coating agent column fed into the pig package is to be reused after the reflow process at the pig source station, since the injected lubricant in the prior art leads to a corresponding contamination of the clamped coating agent column. In the coating agent supply device according to the disclosure, it is therefore intended to prevent the lubricant from being fed into the pig line between the two pigs of the pig package. Rather, during a reflow process, the lubricant should be introduced into the pig line in front of the pig package in relation to the direction of movement of the pigs during the reflow process. The coating agent supply device according to the disclosure therefore preferably has a sensor which is arranged on the pig line and serves to detect the filling state of the pig line at a measuring point.

For example, this sensor can distinguish whether the pig line is filled with coating agent or with air, whereby the feeding of the lubricant into the pig line can be blocked if the sensor detects that the pig line is filled with coating agent at the measuring point. The introduction of the lubricant into the pig line is therefore preferably only released when the sensor detects that the pig line is filled with air at the measuring point.

An alternative measuring method is for the sensor to detect the pigs passing through and report it to a control unit. For example, a permanent magnet can be embedded in the pigs, with the permanent magnet being detected by a magnetic sensor when the pig with the embedded permanent magnet passes the magnetic sensor. Alternatively, there is the possibility that a steel core is embedded in the pigs, which can then be detected by an inductive sensor. The control unit then always knows where the pig package with the two pigs is located, so that the control unit can block the feeding of the lubricant into the pig line if the pig package is at the lubricant feed point.

In the preferred embodiment of the disclosure, the sensor is arranged between the lubricant valve and the pig destination station, preferably closer to the lubricant valve than to the pig destination station. The distance between the measuring point and the lubricant feed point should be as small as possible so that the sensor provides information about the filling status of the pig line at the lubricant feed point. The distance between the measuring point on the one hand and the lubricant feed point on the other hand is preferably smaller than 1 m, 50 cm, 25 cm, 10 cm or even smaller than 5 cm along the pig line.

It should also be mentioned that the lubricant valve is preferably arranged in the pig line and has a continuous pig channel that the pigs can pass through. For this purpose, the lubricant valve is inserted into the pig line, which can consist of several hose lines. The integrated pig channel in the lubricant valve allows the pigs to be guided along the pig line through the lubricant valve.

In the preferred embodiment of the disclosure, the lubricant valve has a first line connection to which an upstream line section (e.g. hose line) of the pig line is connected. In addition, the lubricant valve preferably has a second line connection to which a downstream line section (e.g. hose line) of the pig line is connected. The pig channel runs in the lubricant valve between the two line connections. The two line connections are preferably arranged in axial alignment, but in principle a curved alignment of the two line connections relative to another is also possible, provided that this does not impair piggability.

It should also be mentioned that the two line connections are preferably designed as hose connections with a screw flange.

In addition, the lubricant valve has a lubricant connection to supply the lubricant.

Furthermore, the lubricant valve preferably contains a displaceable valve needle, which either releases or closes a valve seat depending on its valve position, the valve needle preferably being aligned at right angles to the multi-channel running in the lubricant valve.

It should also be mentioned that the lubricant valve is preferably controlled pneumatically, but electrical or electromagnetic control of the lubricant valve is also possible.

It was already explained at the beginning of the prior art that the pig line enables a potential separation between the pig source station, which is at earth potential, and the pig destination station, which is selectively either at earth potential or can be charged to high voltage potential. This is preferably also the case with the coating agent supply device according to the disclosure.

Regarding the pig source station, it should also be mentioned that it preferably contains a controllable valve arrangement with numerous valves in order to optionally connect the pig line to one of the following components:

At least one coating agent supply for supplying coating agent, a rinsing agent supply for supplying rinsing agent for rinsing the pig line, a compressed air supply for supplying compressed air, for example as a pushing medium for moving the pigs from the pig source station to the pig destination station, a coating agent return for returning coating agent for reuse of the coating agent after a reflow process, a disposal for the disposal of rinsing agent and/or coating agent, a supply line for another pushing medium for pushing the pigs from the pig source station to the pig destination station, a recirculation to relieve the air pressure in the pig line during the reflow process.

In addition, the pig destination station preferably also has a controllable valve arrangement which contains numerous controllable valves in order to optionally connect the pig line in the pig destination station to one of the following components:

a paint line for forwarding the removed coating agent from the pig destination station to the applicator (e.g. rotary atomizer), a compressed air supply for supplying compressed air as a pushing medium for pushing the pigs from the pig destination station back to the pig source station, for example as part of the reflow process, a rinsing agent supply for supplying rinsing agent for rinsing the pig line, a coating agent return for returning coating agent for reuse of the coating agent.

a return to relieve the air pressure in the pig line during the pushout process, i.e. during a loading process (pig travel from the pig source station to the pig destination station).

Furthermore, it should be mentioned that the coating agent supply device preferably has a control unit which controls the valve arrangements in the pig source station and in the pig destination station. In addition, the control unit queries the sensor mentioned above and controls the lubricant valve accordingly.

Furthermore, it should be mentioned that the disclosure does not only claim protection for the coating agent supply device according to the disclosure described above. Rather, the disclosure also claims protection for a coating system for coating components with a coating agent (e.g. paint), the coating system comprising the coating agent supply device according to the disclosure described above. In addition, the coating system according to the disclosure also comprises at least one applicator (e.g. rotary atomizer) and preferably also an application robot that guides the applicator.

Finally, the disclosure also claims protection for a corresponding operating method, whereby the individual process steps of the operating method according to the disclosure are already apparent from the above description of the coating agent supply device according to the disclosure and therefore do not need to be described in more detail.

However, it is worth mentioning that the operating method according to the disclosure provides that the pig package is moved at a significantly higher speed of movement as part of the reflow process than was possible in the prior art. The movement speed of the pigs is therefore more than 1 m/s, 2 m/s, 5 m/s, 10 m/s or even more than 20 m/s, particularly in the reflow process. This is made possible by the lubrication of the pigs according to the disclosure, as already described above.

The exemplary embodiment of a paint supply according to the disclosure shown in the drawings will now be described below, the paint supply in a paint shop for painting motor vehicle body components serving to supply a rotary atomizer (not shown) with the paint to be applied.

The paint supply comprises a pig source station 1, which is supplied with paint via several paint connections QFa-QFd.

The pig source station 1 is connected via a pig line 2 to a pig destination station 3, which forwards the paint to be applied to the rotary atomizer (not shown) via a connection ZF.

Figure 2:
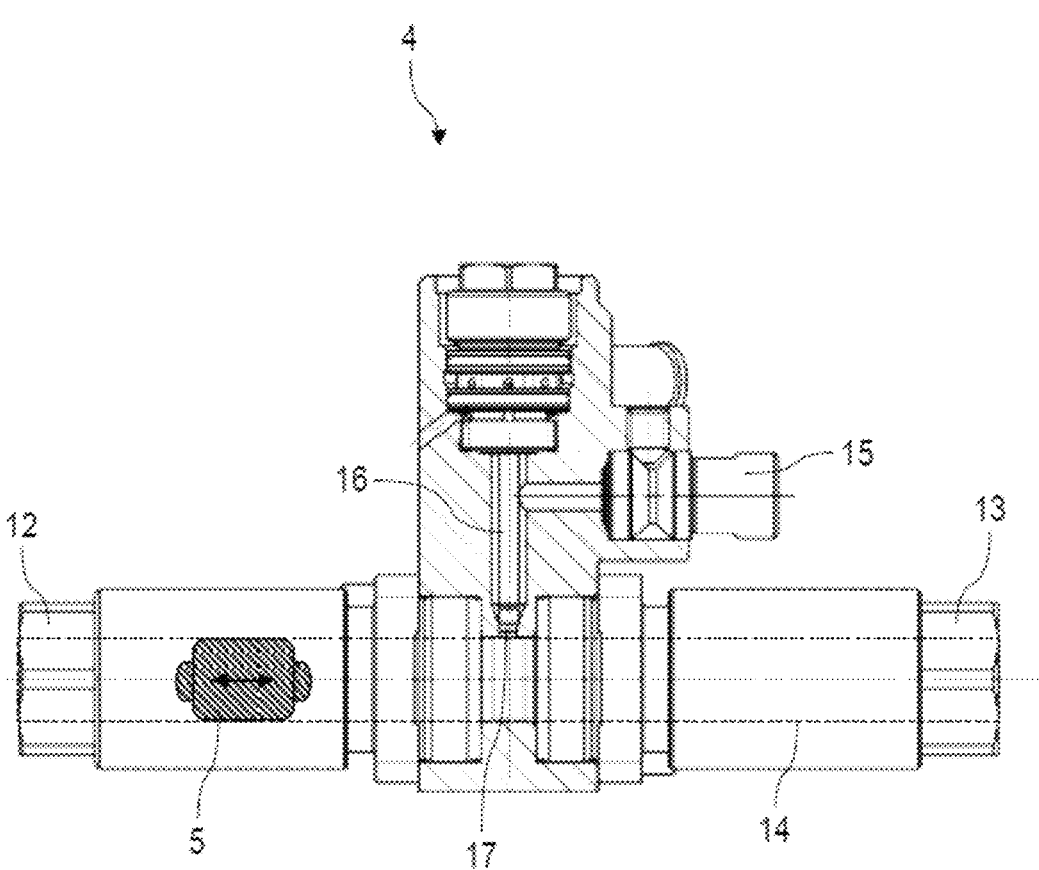
FIG. 2 shows a sectional view of a lubricant valve in the paint supply according to FIG. 1.

A lubricant valve 4 is arranged in the pig line 2, which is shown in detail in FIG. 2 and will be described in more detail. At this point it should only be briefly mentioned that the lubricant valve 4 is intended to introduce lubricant into the pig line 2 in order to reduce the friction in the pig line 2.

Furthermore, there is a movable pig package in the pig line 2, which consists of two pigs, namely a pushout pig 5 and a reflow pig 6. A paint column 7 can be clamped in the pig package between the pushout pig 5 and the reflow pig 6, which is transported in a pushout process from the pig source station 1 to the pig destination station 3 and in a reflow process in the opposite direction from the pig destination station 3 to the pig source station 1.

The movement of the pig package from the pig source station 1 to the pig destination station 3 takes place in a pushout process in that a pushing medium (e.g. compressed air) is introduced into the pig line 2 at the pig source station 1 via a connection QMS, whereby this pushing medium then transports the pig package with the pushout pig 5 and the reflow pig 6 along the pig line 2 to the pig destination station 3.

In a reflow process, the pig package with the pushout pig 5 and the reflow pig 6 is transported along the pig line 2 in the opposite direction, i.e. from the pig destination station 3 to the pig source station 1. For this purpose, at the pig destination station 3, a pushing medium (e.g. compressed air) is introduced into the pig line 2 via a connection ZMS, whereby the pushing medium then presses on the reflow pig 6 and transports the complete pig package with the paint column 7 clamped in between along the pig line 2 to the pig source station 1. The paint column 7 returned to the pig source station 1 can then be returned to the paint connections QFa-QFd to enable reuse.

During the reflow process, the pig package moves with the pushout pig 5 and the reflow pig 6 and the paint column 7 clamped between them in the otherwise dry pig line 2, i.e. the pig line 2 is empty between the pushout pig 5 and the pig source station 1. This leads to increased friction between the pushout pig 5 and the walls of the pig line 2, which has a negative effect on the service life of the pushout pig 5 and limits the maximum possible movement speed of the pig package during the reflow process, so that damage to the pushout pig 5 or the reflow pig 6 is prevented. The disclosure therefore provides that in a reflow process, a lubricant is fed into the pig line 2 between the pushout pig 5 and the pig source station 1, the lubricant then forming a lubricant column 8 in the pig line 2, which is during the reflow process located in front of the pushout pig 5 with regard to the direction of movement of the pushout pig 5. This reduces the friction of the pushout pig 5 during the reflow process in the otherwise empty pig line 2, which enables a greater movement speed of the pig package during the reflow process.

The lubricant is introduced into the pig line 2 through the lubricant valve 4 already mentioned above, which is arranged in the pig line 2. When introducing the lubricant into the pig line 2, however, it must be prevented that the lubricant is fed into the paint column 7, which is clamped in the pig package between the pushout pig 5 and the reflow pig 6. This would lead to contamination of the paint in the paint column 7, which would prevent the paint from being reused.

The paint supply according to the disclosure therefore comprises a sensor 9, which is arranged on the pig line 2 near the pig destination station 3 and detects the filling state of the pig line 2. So there is an air column 10 in the pig line 2 during the reflow process in the direction of movement in front of the pig package with the clamped paint column 7, whereby the sensor 9 can detect whether the air column 10 or the paint column 7 is located at the measuring point in the pig line 2. The sensor 9 is queried by a control unit 11, which then controls the lubricant valve 4 accordingly. This means that lubricant is only fed into the pig line 2 via the lubricant valve 4 if the sensor 9 has detected that the air column 10 is located at the measuring point in the pig line 2. If, on the other hand, the sensor 9 detects that the paint column 7 is located in the pig line 2 at the measuring point, the control unit 11 blocks the feeding of the lubricant into the pig line 2.

The position of the lubricant valve 4, which should be as close as reasonably possible to the pig destination station 3, so that the pushout pig 5, if possible, during its entire backward movement from the pig destination station 3 to the pig source station 1 as part of the reflow process is lubricated. The distance between the lubricant valve 4 and the pig destination station 3 along the pig line can therefore be smaller than 10 cm, for example.

Furthermore, the position of the sensor 9 along the pig line 2 is disclosed. The sensor 9 and its measuring point should be located as close as reasonably possible to the lubricant feed point of the lubricant valve 4. This is important so that the sensor 9 then detects the filling status of the pig line 2 at the lubricant feed point of the lubricant valve 4.

Furthermore, it should be mentioned that the control unit 11 also controls numerous valves in the pig source station 1 and numerous valves in the pig destination station 3 in order to control the operation of the paint supply. At this point it should only be mentioned that the pig source station 1 has the following connections:

QFa: Paint connection of the pig source station for feeding paint a

QFb: Paint connection of the pig source station for feeding paint b

QFc: Paint connection of the pig source station for feeding paint c

QFd: Paint connection of the pig source station for feeding paint d

QHD: Connection of the pig source station for high pressure supply

QMS: Connection of the pig source station for feeding pushing medium

QND: Connection of the pig source station for low pressure supply

QRFad: Return in the pig source station for flushing process

QRFbc: Return in the pig source station for flushing process

QV: Connection of the pig source station for supplying diluent.

RF: Return

QZYe: Connection of the pig source station for retracting the cylinder

QZYa: Connection of the pig source station to extend the cylinder

QRFD: Connection of pig source station for throttle return

QMPI: Connection of the pig source station push-out initiator.

QMRI: Connection of the pig source station reflow initiator

It should also be mentioned that the pig destination station 3 also has the following connections:

ZF: Connection of the pig destination station for delivery of paint to the applicator ZRF: Connection of the pig destination station for delivery of paint in return ZHD: Connection of the pig destination station for high pressure supply.

ZND: Connection of the pig destination station for low pressure supply

ZMS: Connection of the pig destination station for feeding pig pushing medium.

ZRFD: Connection of the pig destination station for throttle return.

ZMRI: Pig destination station pig reflow initiator

It should also be mentioned that the pig source station 1 is at an electrical ground potential during operation. The pig destination station 3, on the other hand, can selectively either be placed at earth potential or at high voltage potential in order to enable electrostatic charging of the coating agent. When the pig destination station 3 is charged to high voltage potential, the pig line 2 is completely emptied and cleaned in order to form the greatest possible electrical resistance, which enables potential separation between the pig source station 1 on the one hand and the pig destination station 3 on the other hand.

The detailed representation of the lubricant valve 4 according to FIG. 2 will now be described below. The lubricant valve 4 has two line connections 12, 13, which are connected to an upstream or downstream line section of the pig line 2. It should be mentioned here that the two line connections 12, 13 are arranged axially aligned. This enables a pig channel 14 to pass through the lubricant valve 4. The pig package with the pushout pig 5 and the reflow pig 6 can therefore pass through the pig channel 14 in the lubricant valve 4 unhindered.

In addition, the lubricant valve 4 comprises a lubricant connection 15 through which the desired lubricant can be supplied.

In the lubricant valve 4 there is a movable valve needle 16, which releases or closes a valve seat 17 depending on its valve position. When the valve seat 17 is released by the valve needle 16, lubricant can then be introduced into the pig channel 14 and thus into the pig line 2 via the lubricant connection 15.

The valve needle 16 can be controlled electromagnetically, for example.

Figure 3:
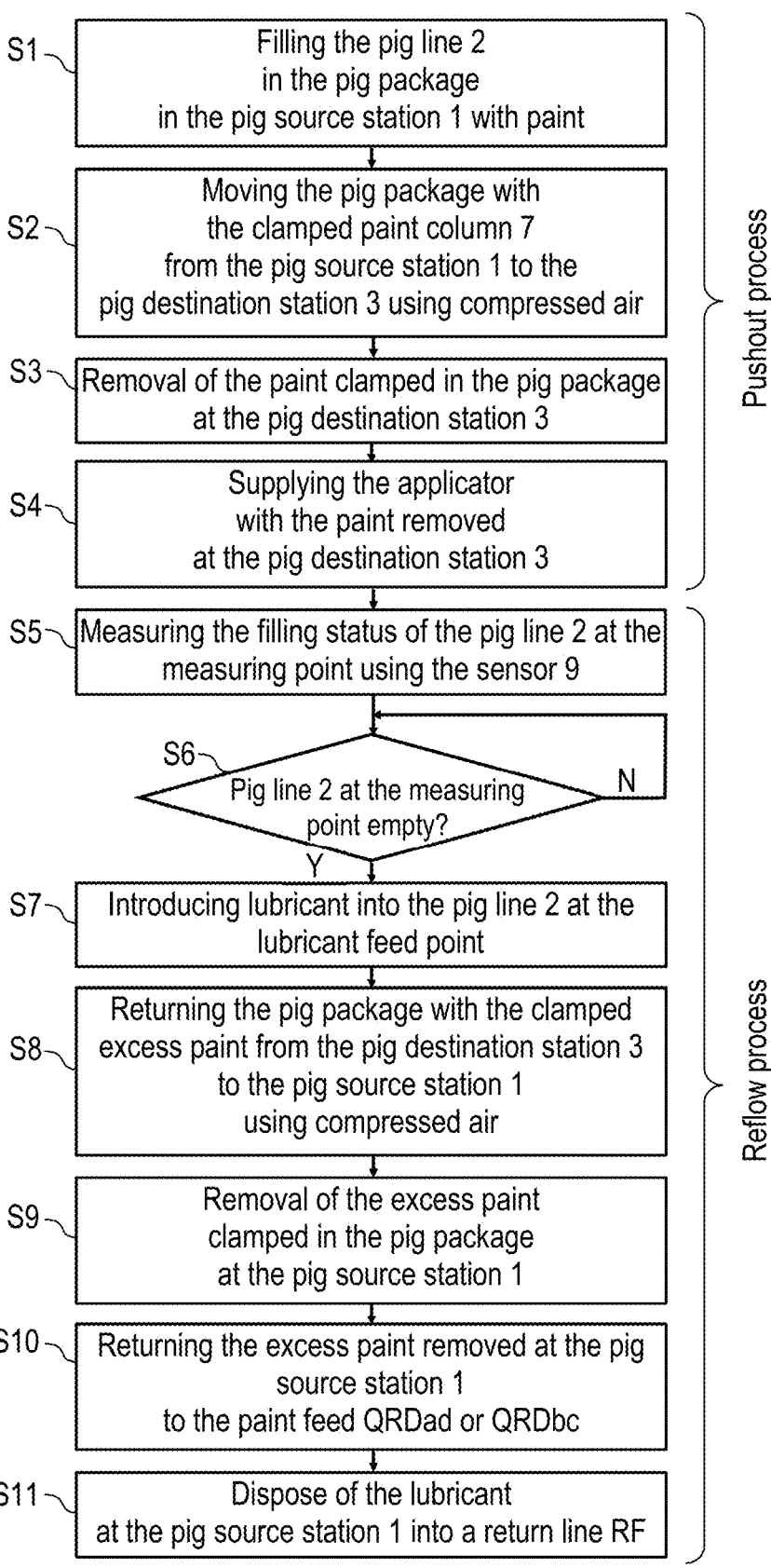
FIG. 3 shows a flow chart to illustrate the operating method according to the disclosure for the paint supply according to FIG. 1.

The flowchart according to FIG. 3 will now be described below, which explains the operating method of the paint supply according to the disclosure.

Steps S1-S4 provide for the so-called pushout process, which is used to supply the applicator with paint.

In a first step S1, the pig line 2 in the pig package between the pushout pig 5 and the reflow pig 6 at the pig source station 1 is filled with paint.

The pig package with the clamped paint column 7 is then moved from the pig source station 1 to the pig destination station 3 in a step S2. For this purpose, a pushing medium (e.g. compressed air) is introduced into the pig line 2 at the pig source station 1 via the connection QMS, with the pushing medium then pushing the pig package along the pig line 2 to the pig destination station 3.

After the pig package arrives at the pig destination station 3, paint is then removed from the clamped paint column 7 from the pig line 2 and fed to the applicator.

Steps S5-S11 now illustrate the so-called reflow process.

In a step S5, the filling state of the pig line 2 is measured at the measuring point of the sensor 9.

In a step S6 it is then checked whether the pig line 2 at the measuring point of the sensor 9 is empty.

If this is the case, in a step S7 lubricant is fed by the lubricant valve 4 into the pig line 2, the lubricant then forming the lubricant column 8.

The pig package with the clamped paint column 7 is then returned from the pig destination station 3 to the pig source station 1 in a step S8. For this purpose, a pushing medium (e.g. compressed air) is introduced into the pig line 2 at the pig destination station 3 via the ZMS connection. The pushing medium then pushes the pig package along the pig line 2 to the pig source station 1.

After the arrival of the pig package in the pig source station 1, the paint from the clamped paint column 7 is then removed from the pig package in step S10 (step S9) and returned to the paint connections QFa, QFb, QFc, QFd (returns), which means reuse-dung enables.

Finally, in a step S11, the lubricant from the lubricant column 8 can be disposed of into the return RF.

LIST OF REFERENCE SIGNS

1 Pig source station
2 Pig line
3 Pig destination station
4 Lubricant valve in the pig line
5 Pushout pig for pushing out the paint to be applied
6 Reflow pig for returning excess paint
7 Paint column between pushout pig and reflow pig
8 Lubricant column in front of the pushout pig
9 Sensor in the pig line
10 Air column in the pig line
11 Control unit
12 Line connection of the lubricant valve with screw flange
13 Line connection of the lubricant valve with screw flange
14 Pig channel in the lubricant valve
15 Lubricant connection of the lubricant valve
16 Valve needle of the lubricant valve
17 Valve seat in the lubricant valve
QFa Paint connection of the pig source station for feeding paint a QFb Paint connection of the pig source station for feeding paint b
QFc Paint connection of the pig source station for feeding paint c
QFd Paint connection of the pig source station for feeding paint d
QHD Connection of the pig source station for high pressure supply
QMS Connection of the pig source station for feeding pushing medium
QND Connection of the pig source station for low pressure supply
QRFad Return in the pig source station for flushing process
QRFbc Return in the pig source station for flushing process
QV Connection of the pig source station for supplying thinner
RF Feedback
QZYe Connection of the pig source station to retract the cylinder
QZYa Connection of the pig source station to extend the cylinder
QRFD Connection of the pig source station for throttle return
QMPI Connection of the pig source station push-out initiator
QMRI Connection of the pig source station reflow initiator
ZF Connection of the pig destination station for delivery of paint to the applicator
ZRF Connection of the pig destination station for delivery of paint in return
ZHD Connection of the pig destination station for high pressure supply
ZND Connection of the pig destination station for low pressure supply
ZMS Connection of the pig destination station for feeding pig pushing medium
ZRFD Connection of the pig destination station for throttle return
ZMRI Pig destination station pig reflow initiator

The invention claimed is:

1. A coating agent supply device for supplying coating agent to an applicator, with
   a) a pig source station,
   b) a pig destination station,
   c) a pig line, the pig line connecting the pig source station with the pig destination station,
   d) a pig package with two pigs arranged in the pig line for clamping the coating agent between the two pigs of the pig package for coating agent transport between the pig source station and the pig-destination station,
   e) a lubricant supply line for supplying a lubricant for friction-reducing lubrication of the pigs in the pig line when moving the pig package between the pig destination station and the pig source station, and
   f) a controllable lubricant valve, which connects the lubricant supply line to the pig line in order to introduce the lubricant into the pig line at a lubricant feed point,
   g) wherein the lubricant feed point is located in the pig line between the pig source station and the pig destination station.

2. The coating agent supply device according to claim 1, wherein the lubricant valve in the pig line is arranged closer to the pig destination station than to the pig source station.

3. The coating agent supply device according to claim 1, wherein the lubricant valve in the pig line is arranged in the downstream 50% of the line length of the pig line.

4. The coating agent supply device according to claim 1, wherein the lubricant valve in the pig line is arranged at a distance of less than 15 m from the pig destination station.

5. The coating agent supply device according to claim 1, wherein a) an electrostatic coating agent charging system is provided which charges the pig destination station to a high voltage potential at least temporarily, and b) the pig source station is electrically grounded.

6. The coating agent supply device according to claim 1, wherein a) the pig source station comprises a controllable valve arrangement, the valve arrangement in the pig source station selectively connecting the pig line to one of the following components:

a1) at least one coating agent supply, a2) a rinsing agent supply, a3) a compressed air supply, a4) at least one flushing line for flushing the pig source station, a5) a disposal, a6) a feed line for a pushing medium for pushing the pigs to the pig destination station, and b) the pig destination station comprises a controllable valve arrangement, the valve arrangement in the pig destination station selectively connecting the pig line to one of the following components:

b1) a paint line for forwarding the removed coating agent from the pig destination station to the applicator, b2) a compressed air supply, b3) a rinsing agent supply, and b4) coating agent return.

7. The coating agent supply device according to claim 6, wherein a) that a control unit is provided, b) that the control unit controls the valve arrangement in the pig source station, c) that the control unit controls the valve arrangement in the pig destination station, d) that the control unit queries the sensor, and e) that the control unit controls the lubricant valve.

8. The coating agent supply device according to claim 1, wherein the lubricant valve is arranged in the pig line and has a continuous piggable pig channel which can be passed by the pigs.

9. The coating agent supply device according to claim 8, wherein a) the lubricant valve comprises a first line connection to which an upstream line section of the pig line is connected, b) the lubricant valve comprises a second line connection to which a downstream line section of the pig line is connected, c) the pig channel in the lubricant valve connects the first line connection with the second line connection, d) the lubricant valve comprises a lubricant connection to supply the lubricant.

10. The coating agent supply device according to claim 9, wherein a) the two line connections are arranged axially aligned, and b) the two line connections are designed as hose connections and with a screw flange.

11. The coating agent supply device according to claim 10, wherein a) the lubricant valve contains a displaceable valve needle which either releases or closes a valve seat depending on its valve position, b) the valve needle of the lubricant valve is aligned at right angles to the pig channel running in the lubricant valve, c) the lubricant valve is pneumatically controlled.

12. The coating agent supply device according to claim 1, further comprising a sensor on the pig line for detecting the filling state of the pig line at a measuring point.

13. The coating agent supply device according to claim 12, wherein the sensor is adapted to distinguish between air and coating agent in the pig line.

14. The coating agent supply device according to claim 12, wherein the sensor is arranged between the lubricant valve and the pig destination station.

15. The coating agent supply device according to claim 12, wherein the sensor is arranged closer to the lubricant valve than to the pig destination station.

16. The coating agent supply device according to claim 12, wherein the sensor is arranged at a distance of less than 1 m from the lubricant valve, so that the sensor measures as close as possible to the lubricant feed point.

17. A method for a coating agent supply device, comprising:

a) filling the line section of the pig line in the pig package between the two pigs with the coating agent, the filling taking place in the pig source station, b) moving the pig package with the coating agent clamped between the two pigs in the pig line from the pig source station to the pig destination station by introducing compressed air into the pig line at the pig source station upstream in front of the pig package, c) removal of the coating agent clamped between the two pigs of the pig package in the pig line, the coating agent being removed at the pig destination station, d) supplying the applicator with the coating agent taken from the pig package and applying the coating agent, with excess coating agent remaining in the pig package, e) returning the pig package with the excess coating agent clamped between the two pigs from the pig destination station to the pig source station by introducing compressed air into the pig line at the pig destination station downstream behind the pig package, f) removal of the excess coating agent clamped between the two pigs at the pig source station, and g) returning the excess coating agent removed from the pig package at the pig source station to the coating agent return, h) introducing the lubricant into the pig line at the lubricant feed point in order to reduce the friction of the pigs in the pig line when returning the pig package from the pig destination station to the pig source station, i) wherein the lubricant feed point is between the pig source station and the pig package.

18. The method according to claim 17, wherein a) before introducing the lubricant, the sensor checks whether the lubricant feed point is located upstream of the pig package, and b) the lubricant is only fed into the pig line if the lubricant feed point is located upstream of the pig package.

19. The method according to claim 18, wherein, after returning the pig package from the pig destination station to the pig source station, the lubricant in the pig source station is disposed of into the disposal.

20. The method according to claim 19, wherein the pig package is moved at a speed of more than 1 m/s during the backward movement from the pig destination station to the pig source station and/or in the forward movement from the pig source station to the pig destination station.

\* \* \* \* \*